(12) United States Patent
Tillotson

(10) Patent No.: US 11,876,388 B2
(45) Date of Patent: Jan. 16, 2024

(54) BEAMED POWER SYSTEM AND METHOD

(71) Applicant: The Boeing Company, Chicago, IL (US)

(72) Inventor: Brian J. Tillotson, Kent, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 16/677,096

(22) Filed: Nov. 7, 2019

(65) Prior Publication Data

US 2021/0143689 A1 May 13, 2021

(51) Int. Cl.
H02J 50/90 (2016.01)
H02J 50/30 (2016.01)
H02J 50/20 (2016.01)

(52) U.S. Cl.
CPC ............. H02J 50/90 (2016.02); H02J 50/20 (2016.02); H02J 50/30 (2016.02)

(58) Field of Classification Search
CPC ............. H02J 50/90; H02J 50/30; H02J 50/20
USPC ......................................................... 307/9.1
See application file for complete search history.

(56) References Cited

U.S. PATENT DOCUMENTS

| | | | |
|---|---|---|---|
| 4,925,303 A * | 5/1990 | Pusic .................... | G01C 9/005 356/152.3 |
| 7,711,441 B2 | 5/2010 | Tillotson | |
| 7,929,908 B2 | 4/2011 | Tillotson | |
| 8,469,122 B2 * | 6/2013 | Perlman ................ | H02J 50/10 180/2.1 |
| 8,735,712 B2 | 5/2014 | Tillotson | |
| 8,788,119 B2 | 7/2014 | Tillotson et al. | |
| 8,899,012 B1 | 12/2014 | Tillotson | |
| 10,155,586 B2 * | 12/2018 | Liu ........................ | H02S 40/38 |
| 11,214,386 B2 * | 1/2022 | Tajika ..................... | B64F 3/02 |
| 2002/0046763 A1 * | 4/2002 | Berrios ................... | H02J 7/025 136/244 |
| 2011/0266995 A1 * | 11/2011 | Winfield ................ | H02J 7/025 320/103 |
| 2016/0009402 A1 * | 1/2016 | Hunter .................... | B64C 39/02 244/53 R |

* cited by examiner

Primary Examiner — Richard Tan
(74) Attorney, Agent, or Firm — Jordan IP Law, LLC

(57) ABSTRACT

A transmitter for providing energy to a beam-powered aircraft includes an energy source that outputs an energy beam having an elongated cross-section, and a mount. The mount is operable to vary an azimuth and an elevation of the energy beam, and operable to rotate the energy beam about a central axis of the energy beam.

20 Claims, 9 Drawing Sheets

BEAMED POWER SYSTEM AND METHOD

FIELD

The field of the disclosure relates generally to beamed power systems and, more specifically, to systems and devices for providing energy to a beam-powered aircraft.

BACKGROUND

Aircraft are typically limited in flight range and flight duration by fuel capacity and fuel consumption. These limits require aircraft to return for refueling and also prevent them from unlimited flight ranges. Further, aircraft are generally also limited by weight constraints, such as the weight of the fuel necessary for travel that limits the speed and cargo capacity of the aircraft.

Some electric-powered aircraft use batteries and/or solar power to attempt to achieve satisfactory endurance and range. Batteries generally have inadequate energy density to achieve long-range flight. Solar power systems experience limited power due to weather and atmospheric changes, limited sunlight in higher latitudes and in winter, and the absence of sunlight at night. The low power density of solar powered systems generally requires fragile structures that have exceptionally light weight and a high aspect ratio for the photovoltaic (PV) cells. A combination of batteries and solar power may allow an aircraft to use solar power to power the aircraft and charge the batteries when sunlight is available, and use the energy in the batteries at times of reduced solar availability. However, including batteries in an aircraft increases the weight of the aircraft and generally reduces the cargo carrying capacity of the aircraft.

Some aircraft use laser or microwave power beamed from the Earth's surface, from other aircraft, or from satellites orbiting the Earth to power to the aircraft. Beam-powered aircraft can theoretically achieve indefinite endurance with useful payloads. However, beam receivers for receiving the beamed power on the aircraft are typically circular attachments positioned on the bottom of the aircraft to receive the roughly circular beams used by most known beam transmitters. The circular beam receivers are generally relatively large and impose penalties in weight, drag, and cost. Additionally, the curvature of the earth limits the line-of-sight distance from each transmitter to an aircraft. This generally requires either relatively short range for the aircraft or multiple transmitters distributed along the aircraft's route.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

One aspect of the present disclosure is a transmitter for providing energy to a beam-powered aircraft. The transmitter includes an energy source that outputs an energy beam having an elongated cross-section, and a mount operable to vary an azimuth and an elevation of the energy beam, and operable to rotate the energy beam about a central axis of the energy beam.

Another aspect of the present disclosure a beam-powered aircraft system including a beam-powered aircraft having an elongated receiver operable to receive an energy beam to power the beam-powered aircraft, and a transmitter. The transmitter includes an energy source that outputs an energy beam having an elongated cross-section, a mount operable to vary an azimuth and an elevation of the energy beam, and to rotate the energy beam about a central axis of the energy beam, and a controller programmed to control the mount to direct the energy beam at the elongated receiver on the beam-powered aircraft and to rotate the energy beam about the central axis to align the elongated cross-section of the energy beam with the elongated receiver.

Another aspect of the present disclosure is a method for powering a beam-powered aircraft having an elongated receiver with a major axis and a minor axis. The method includes directing an energy beam from an energy source towards the beam-powered aircraft's elongated receiver, the energy beam having an elongated cross-section with a major axis and a minor axis, and rotating the energy beam about a central axis of the energy beam until the energy beam's major axis is aligned with the major axis of the beam-powered aircraft's elongated receiver.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

Although specific features of various examples may be shown in some drawings and not in others, this is for convenience only. Any feature of any drawing may be referenced and/or claimed in combination with any feature of any other drawing.

Unless otherwise indicated, the drawings provided herein are meant to illustrate features of examples of the disclosure. These features are believed to be applicable in a wide variety of systems comprising one or more examples of the disclosure. As such, the drawings are not meant to include all conventional features known by those of ordinary skill in the art to be required for the practice of the examples disclosed herein.

DETAILED DESCRIPTION

Figure 1:
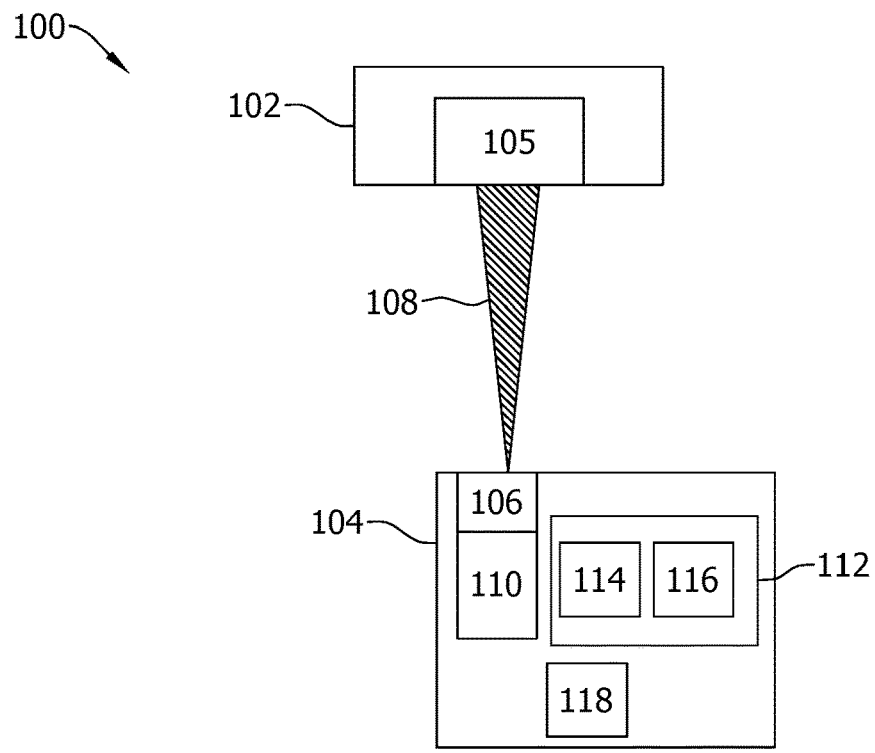
FIG. 1 is a block diagram of a beam-powered aircraft system.

Referring to the drawings, FIG. 1 is a block diagram of a beam-powered aircraft system 100. The system 100 includes a beam-powered aircraft 102 and a transmitter 104. The beam-powered aircraft 103 includes an elongated receiver 105 operable to receive an energy beam to power the beam-powered aircraft 102. The transmitter 104 includes an energy source 106, a mount 110, and a controller 112. The energy source 106 outputs an energy beam 108. The energy beam output by the transmitter's energy source 106 has an elongated cross-section. The mount 110 is operable to vary an azimuth and an elevation of the energy beam, and to rotate the energy beam about a central axis of the energy beam. The controller 112 is programmed to control the transmitter's mount 110 to direct the energy beam 108 at the elongated receiver 105 on the beam-powered aircraft 102 and to rotate the energy beam 108 about the central axis to align the elongated cross-section of the energy beam 108 with the elongated receiver 105.

The beam-powered aircraft 102 is an electric aircraft that uses the energy received from the energy beam 108 to power appropriate electric motors and control systems (not shown) to fly the beam-powered aircraft 102. In an example implementation, the energy from the energy beam 108 is used to charge one or more batteries (not shown) that are used to power the electric motors and control systems. Alternatively, the energy from the energy beam 108 is used directly (with appropriate conversion, regulation, etc.) to power the electric motors and control systems of the beam-powered aircraft 102 without the use of batteries. The beam-powered aircraft 102 may be any suitable manned, unmanned, remotely controlled, computer controlled, or human piloted aircraft. In an example implementation, the beam-powered aircraft 102 is an unmanned drone aircraft.

In some implementations, the beam-powered aircraft 102 converts the energy beam's electromagnetic power into thermal power in a fluid, and uses that hot fluid to power a heat engine. For example, the hot fluid may be used to power a rocket engine, to run a jet, to run a propeller, or the like.

In an example implementation, the beamed energy is optical energy. In such implementation, the energy source 106 is a light source and the energy beam 108 is a light beam. The elongated receiver 105 is a light sensitive receiver, such as one or more photovoltaic (PV) cells (not shown in FIG. 1) combined to form an elongated receiver. Such implementation allows the beam-powered aircraft 102 to utilize solar power when sufficient sunlight is available and utilize beamed power from the transmitter 104 when sufficient sunlight is unavailable, such as at night, on cloudy days, or the like. The energy source 106 may be a laser or other source that produces coherent light, or may be a lightbulb, an light emitting diode (LED), or other source that produces internally incoherent light as the energy beam 108. Generally, if the distance between the transmitter 104 and the beam-powered aircraft 102 is relatively large, a coherent light source may be more useful because of the ability to maintain a relatively small cross-section of the energy beam 108 to match the size of the elongated receiver 105. As will be described in more detail below, in some implementations, the energy source 106 includes multiple incoherent light sources, each of which produces an energy beam. The combination of the multiple individual energy beams from the transmitter's plurality of incoherent light sources in combination is considered a single, elongated energy beam 108. The individual energy beams that make up the elongated energy beam 108 may themselves have a cross-section that is elongated, circular, or any other suitable shape.

In another implementation, the beamed energy is radio frequency (RF) energy. In such implementation, the energy source 106 is an RF source and the energy beam 108 is an RF beam. The elongated receiver 105 is one or more RF receivers, such as rectenna elements, combined to form an elongated RF receiver. In some implementations, the energy source 106 includes multiple, incoherent RF sources, each of which produces an energy beam. The combination of the multiple individual energy beams from the multiple RF sources in combination is considered a single, elongated energy beam 108. The individual energy beams that make up the elongated energy beam 108 may themselves have a cross-section that is elongated, circular, or any other suitable shape. Incoherent RF sources are RF sources that are incoherent with respect to each other, rather than being internally incoherent. Some implementations using RF energy also include a PV receiver to allow the beam-powered aircraft 102 to utilize solar power when sufficient sunlight is available and utilize beamed power from the transmitter 104 when sufficient sunlight is unavailable, such as at night, on cloudy days, or the like. For example, the RF elongated receiver 105 may be mounted to the bottom side of the wings of the beam-powered aircraft 102, and one or more PV cells may be mounted on the top side of the wings of the beam-powered aircraft 102.

Figure 2:
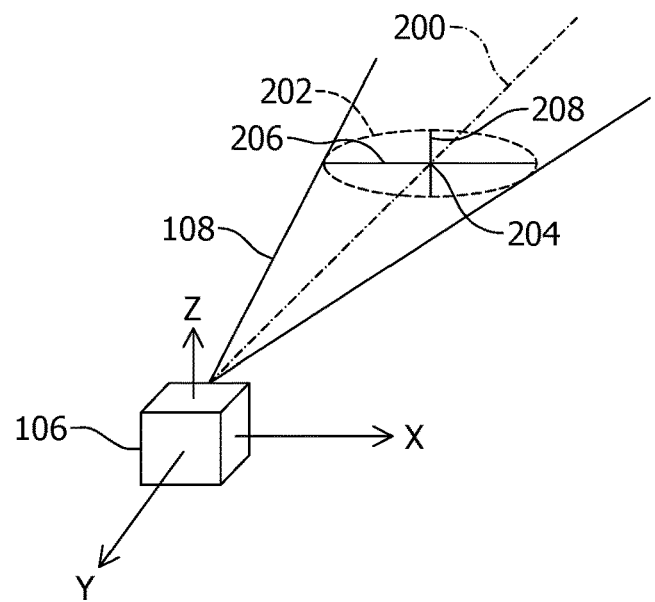
FIG. 2 is a diagram of the energy source in the system of FIG. 1 emitting an energy beam having an elongated cross-section.

In some implementations, the transmitter 104 is a ground-based transmitter. The mount 110 may be a gimbal or other suitable mount attached to a fixed or movable ground-based location, such as a building, a platform, or a ground vehicle (including a car, truck, boat, hovercraft, or the like). With reference to FIG. 2, the mount is operable to vary the azimuth of the energy beam 108 by rotation in the XY plane (i.e., rotation about the Z axis) of the coordinate system shown centered on the transmitter, and to vary the elevation of the energy beam 108 in the Z direction, such as by pivoting the energy source 106 about the X axis of the coordinate system. The mount 110 is also operable to rotate the energy beam 108 about a central axis 200 of the energy beam 108 to rotate the elongated cross-section 202 of the energy beam 108 around a central point 204. For example, the mount 110 may rotate the energy source 106 or the energy beam 108 about the Y axis of the coordinate system in FIG. 2. The elongated cross-section 202 of the energy beam 108 has a major axis 206 and a minor axis 208 that is shorter than the major axis. In some implementations, the major axis 206 is twice as long as the minor axis 208. In other implementations, the ratio of the length of the major axis 206 to the minor axis 208 (i.e., the aspect ratio) is greater than 2:1. The particular aspect ratio may be selected for particular implementations depending on the particular aircraft or type of beam-powered aircraft with which it will be used. For example, an aspect ratio (AR) range from 2 to about 8 may be used with fighter aircraft and general aviation airplanes like the Piper Cherokee (AR 5.6) and Cessna Skyhawk (AR 7.32). Aircraft in this range generally have low aerodynamic efficiency and are likely to rely on beam power nearly 100% of the time. As aspect ratio from about 8 to about 24 may be used with aircraft for which efficiency is one important attribute among a small number of important attributes. An airliner such as the Bombardier Dash 8 Q-400 (AR 12.8) is an example aircraft within this range. Aircraft may be efficient enough to fly on sunlight during daytime using PV cells—at least while the sun is high in the sky—but will need beamed power to stay aloft through the night or when the sun is near the horizon. As aspect ratio greater than 24 is used with gliders and other aircraft like the ASH 31 (AR 33.5). Thus, in some implementations, the ratio of the length of the major axis 206 to the minor axis 208 is between two and eight, between 8 and 24, or greater than 24. These high aspect ratio aircraft may be efficient enough to fly on sunlight using PV cells near the equator or in high-latitude summer, but they can benefit from beamed power in high-latitude winters. Production of the energy beam 108 with the elongated cross-section 202 may be performed using an appropriately shaped aperture, various lens(s), or the like. In some implementations, the mount 110 rotates the elongated cross-section of the energy beam 108 around its central point by rotating the aperture or adjusting the lens used to shape the energy beam into the elongated cross-section 202), rather than rotating the energy source 106.

When the mount 110 is attached to a moveable ground vehicle, the moveable ground vehicle may provide at least some of the aiming (i.e., varying the azimuth, elevation, and rotation) of the energy beam 108. In such implementations, maneuvering of the vehicle may provide the variation of the azimuth (e.g., by changing the direction of travel of the vehicle), while the mount 110 attached to the vehicle tilts about the X axis to provide the variation of the elevation and rotates the energy source 106 or the energy beam 108 about the Y axis to rotate the energy beam 108 about the central axis. That is, movement of the vehicle provides one axis of adjustment, while the mount 110 attached to the vehicle provides adjustment around the other two axes. Thus, the moveable ground vehicle may be considered part of the mount 110.

In other implementations, the mount 110 includes another aircraft different than the beam-powered aircraft 102. Because the aircraft that is the mount 110 can maneuver in three dimensions, the energy source 106 may be mounted with a fixed orientation and all variation in the direction and orientation of the energy beam 108 may be performed by maneuvering the aircraft. As will be described in more detail below, as the another aircraft follows the beam-powered aircraft 102 and attempts to maintain a fixed relationship to the beam-powered aircraft 102, the movements of the another aircraft will automatically vary the energy beam 108 to maintain its alignment with the elongated receiver 105 of the beam-powered aircraft 102. Because the another aircraft, while airborne, will be closer to the beam-powered aircraft 102 than a ground based transmitter 104 would be, the energy beam 108 will not need to be transmitted as far, and a broader beam may be used while still achieving an appropriate cross-sectional size at the elongated receiver 105 on the beam-powered aircraft 102. Thus, in some implementations, the energy source 106 used on an aircraft based mount 110 may be an incoherent energy source, or incoherent energy sources, which may achieve a satisfactory energy beam 108 at a lower cost and using less energy than at least some coherent energy sources.

The controller 112 may include any suitable combination of analog and/or digital controllers capable of performing as described herein. In the example, the controller 112 includes a processor 114 and a memory 116. The processor 114 is coupled to memory 116 for executing programmed instructions. The processor 114 may include one or more processing units (e.g., in a multi-core configuration). The controller 112 is programmable to perform one or more operations described herein by programming the memory 116 and/or the processor 114. For example, the processor 114 may be programmed by encoding an operation as one or more executable instructions and providing the executable instructions in the memory 116.

The processor 114 may include, but is not limited to, a general purpose central processing unit (CPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer-readable medium including, without limitation, a storage device and/or a memory device. Such instructions, when executed by the processor 114, cause the processor 114 to perform at least a portion of the methods described herein. The above examples are not intended to limit in any way the definition and/or meaning of the term processor.

The memory 116, as described herein, is one or more devices that enable information such as executable instructions and/or other data to be stored and retrieved. The memory 116 may include one or more computer-readable media, such as, without limitation, dynamic random access memory (DRAM), static random access memory (SRAM), a solid state disk, a hard disk, and/or any other suitable type of memory. The memory 116 may be configured to store any instructions or any type of data suitable for use with the methods and systems described herein.

Figure 3:
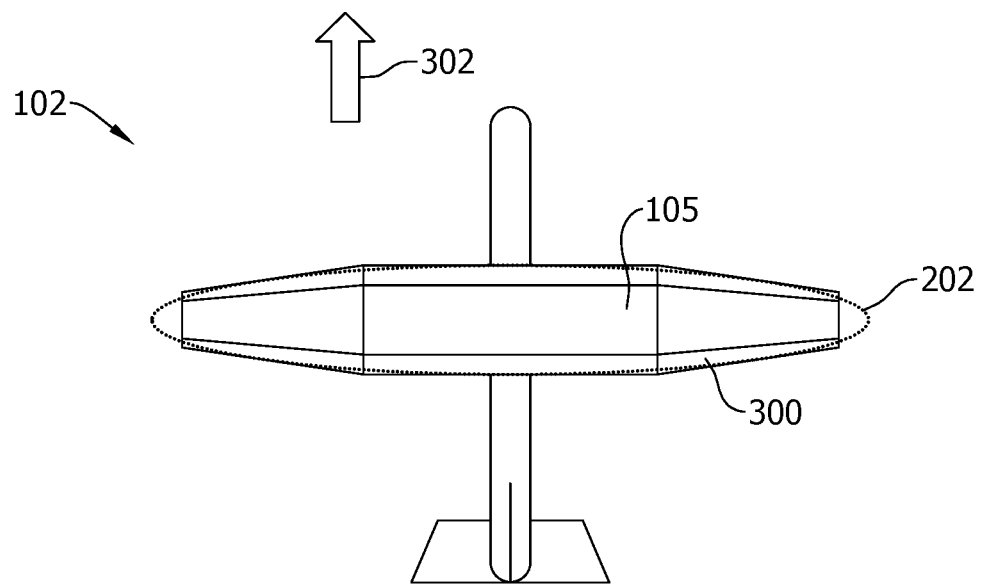
FIG. 3 is a top view of an example beam-powered aircraft of the system in FIG. 1 with the elongated cross section of the energy beam shown aligned with the aircraft's elongated receiver.

FIG. 3 is an example implementation of the beam-powered aircraft 102 in which the elongated receiver 105 is positioned on the wings 300 of the beam-powered aircraft 102. In this implementation, the elongated receiver is an array of PV cells positioned on the top side of the wings 300. To receive the energy beam 108 on the elongated receiver from a ground based transmitter 104 or another aircraft flying below the beam-powered aircraft 102, the beam-powered aircraft 102 flies inverted, with the top of the beam-powered aircraft 102 and the elongated receiver facing toward the ground. Thus, through the inclusion of a single elongated receiver, this example beam-powered aircraft 102 can be powered by sunlight when sufficient sunlight is available, and powered by the energy beam 108 when sufficient sunlight is unavailable. In alternative implementations, the beam-powered aircraft 102 may include a PV array separate from the elongated receiver 105, thereby allowing solar power and/or beamed power to be received without inverting the beam-powered aircraft 102. In still other implementations, the PV array is positioned on the bottom side of the wings 300. In such implementation, the beam-powered aircraft 102 can receive beamed power while flying right side up, and may receive solar power by flying inverted. The beam-powered aircraft 102 is flying in direction 302 relative to the ground.

As seen in FIG. 3, the aspect ratio of the elongated cross-section 202 of the energy beam 108 is similar to the aspect ratio of the wings 300 and the elongated receiver 105 on the wings 300. In this drawing, the energy beam 108 is properly aligned with the elongated receiver 105 and the beam-powered aircraft 102 so that the entire elongated receiver 105 intercepts the energy beam 108, and relatively little of the energy beam is wasted by not being received by the elongated receiver 105.

Figure 4:
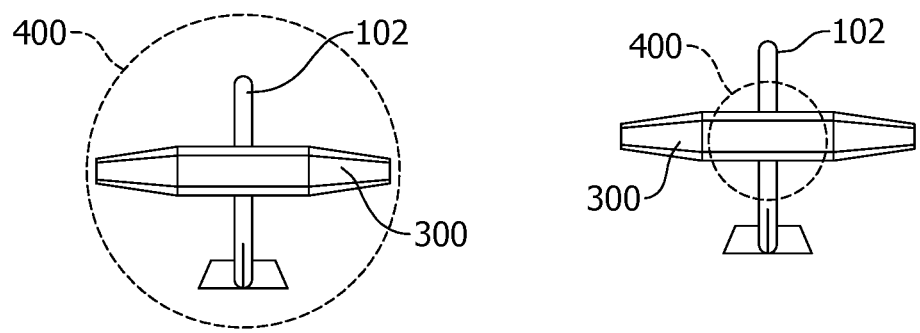
FIG. 4 is a comparative example showing two beam powered aircraft, each with a circular cross section energy beam aligned with the aircraft's elongated receiver.

In contrast, as shown in FIG. 4, if an elongated receiver 105 were used with an energy beam having a circular cross-section 400, either a large amount of the energy beam would miss the elongated receiver 105 and be wasted, or a large amount of the elongated receiver would not intercept the circular cross-section energy beam.

When using the energy beam 108 with an elongated cross-section 202 with the elongated receiver 105, in addition to aiming the energy beam 108 at beam-powered aircraft 102 (i.e. adjusting the azimuth and elevation of the energy beam 108 to track the beam-powered aircraft 102), the beam should be rotated as needed the to maintain alignment of elongated cross-section 202 with the elongated receiver 105 (i.e., maintaining substantial alignment of their respective major axes).

Figure 5:
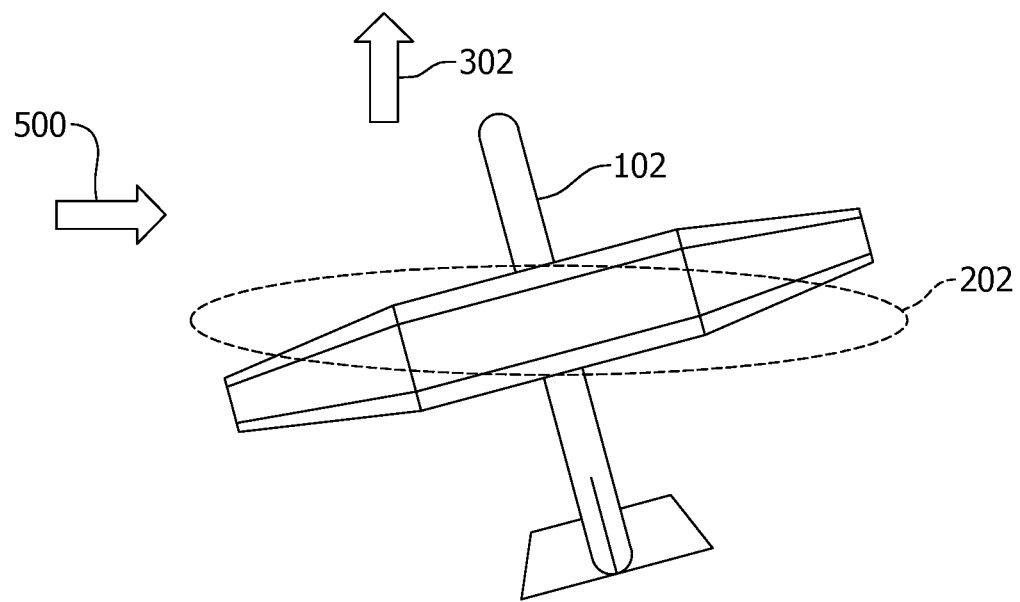
FIG. 5 is a top view of the example beam-powered aircraft of FIG. 3 with the elongated cross section of the energy beam shown misaligned with the aircraft's elongated receiver due to the aircraft flying into a crosswind.
Figure 6:
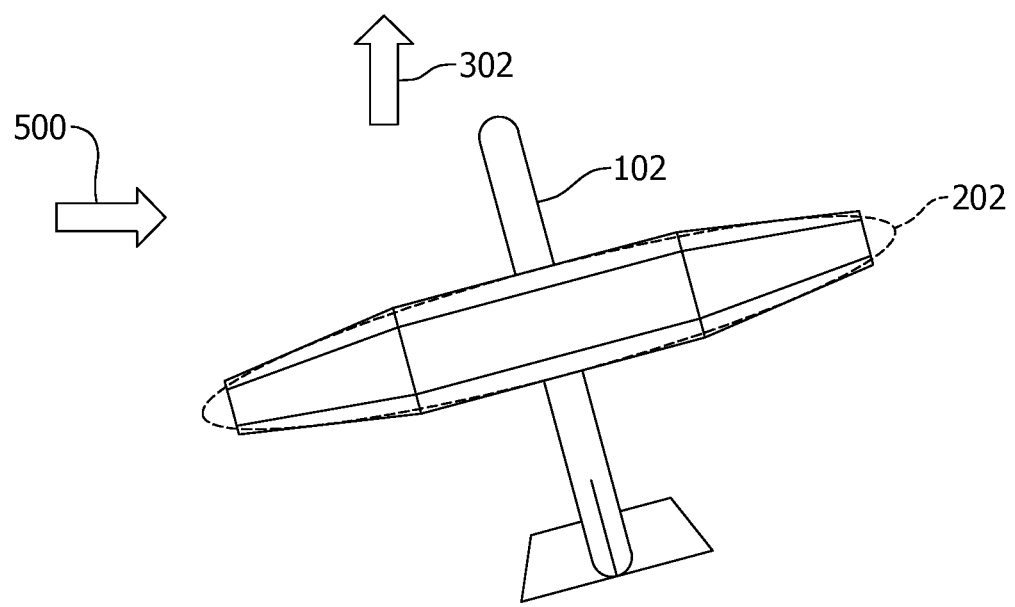
FIG. 6 is a top view of the example beam-powered aircraft of FIG. 5 with the elongated cross section of the energy beam shown aligned with the aircraft's elongated receiver after the energy beam is rotated about its central axis.

For example, if the view in FIG. 3 corresponds to the beam-powered aircraft 102 flying in direction 302 directly above the transmitter 104 in a windless situation, FIG. 5 would correspond to the beam-powered aircraft 102 flying the same ground track direction 302 directly above the transmitter 104 when dealing with a crosswind in direction 500. To fly the same ground track direction 302 with the crosswind, the beam-powered aircraft 102 will be oriented slightly into the wind as shown. If the rotation of the energy beam 108 about its central axis 200 is not adjusted (i.e., it is left as it was in FIG. 3), a portion of the energy beam 108 misses the elongated receiver 105 and a portion of the elongated receiver 105 does not receive the energy beam 108. Thus, the controller 112 controls the mount 110 to rotate the energy beam 108 about its central axis 200 to align the elongated cross-section 202 of the energy beam 108 with the elongated receiver 105, as shown in FIG. 6

In the example implementation, the transmitter 104 includes a tracking system 118 to track a location and orientation of a beam-powered aircraft 102 relative to the transmitter 104. Other implementations do not include the tracking system 118, and may rely on human operation to track the beam-powered aircraft 102 and aim and rotate the energy beam 108. The tracking system 118 may operate on passive feedback, such as the reflection of the energy beam's energy (e.g., light) off of the beam-powered aircraft 102 and back to the transmitter 104. Other implementations utilize an active system in which the beam-powered aircraft 102 transmits a signal to the ground to inform the transmitter 104 of the beam-powered aircraft's location and orientation. U.S. Pat. No. 7,711,441, the entire disclosure of which is incorporated herein by reference, describes an example tracking method that be utilized in the tracking system 118 with suitable modifications for use with an elongated energy beam 108 rather than a circular energy beam.

In some implementations, the mount 110 includes an aircraft separate from the beam-powered aircraft 102. Similar to a ground vehicle based implementation, the aircraft separate from the beam-powered aircraft 102 maneuvers to control aiming of the energy beam 108 in all three axes (elevation, azimuth, and rotation). Alternatively, a separate component of the mount 110, such as a gimbal or turntable, may control one or more axes of the aiming of the energy beam 108, such as the rotation about its central axis 200.

Figure 7:
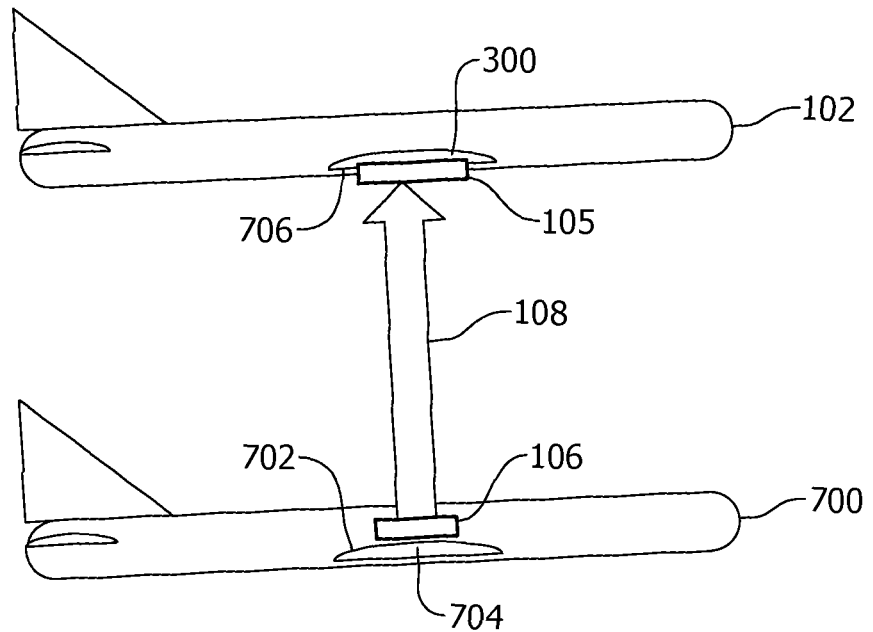
FIG. 7 is a side view of the beam-powered aircraft of FIG. 1 with an additional aircraft serving as the mount of the transmitter.
Figure 8:
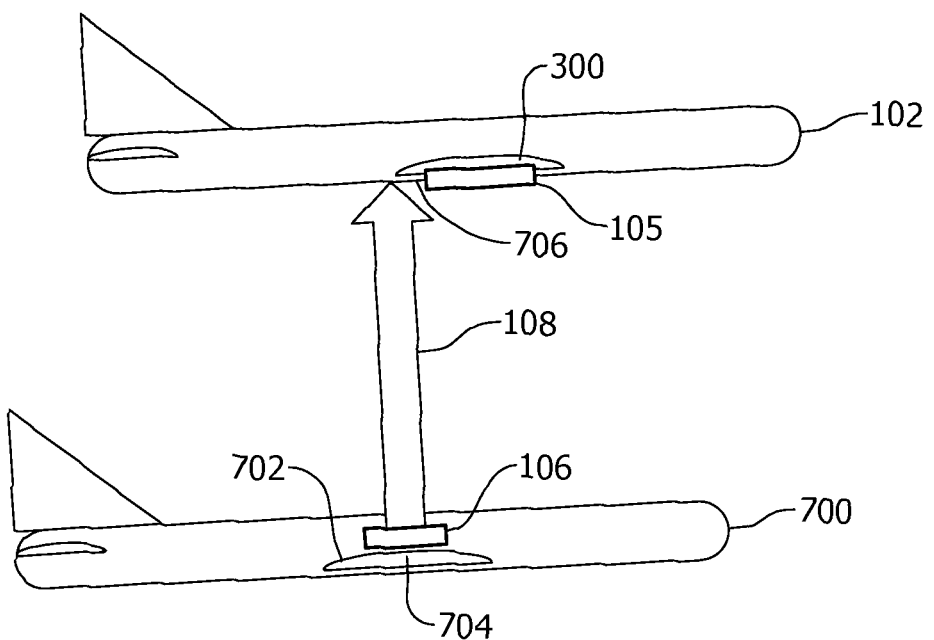
FIG. 8 is a side view of the beam-powered aircraft and the additional aircraft of FIG. 7 with the beam-powered aircraft ahead of the additional aircraft.
Figure 9:
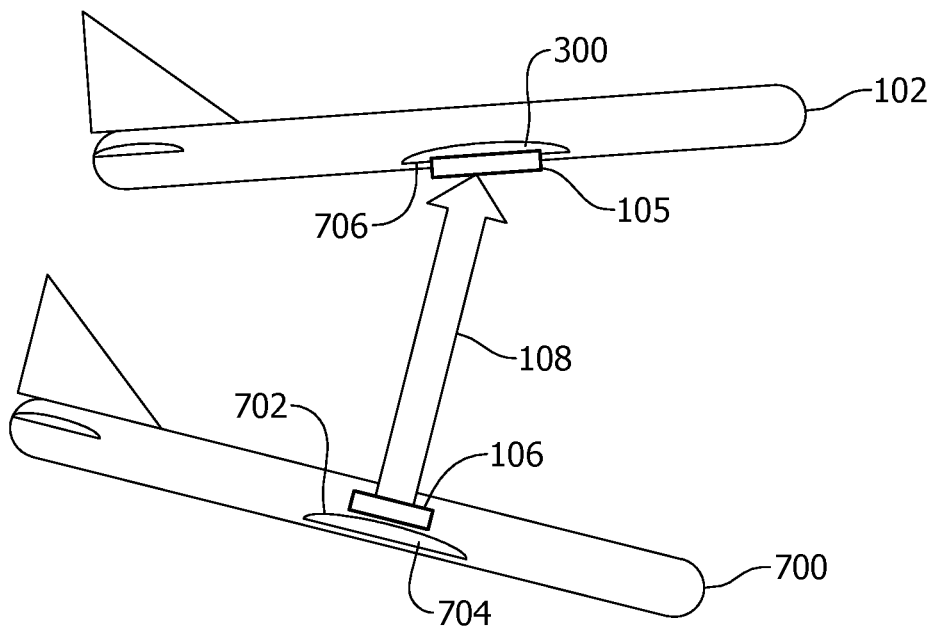
FIG. 9 is a side view of the beam-powered aircraft and the additional aircraft of FIG. 8 when the additional aircraft lowers its nose to speed up and catch up to the beam-powered aircraft.

FIG. 7 is a side view of the beam-powered aircraft 102 with such an additional aircraft 700. The energy source 106 is mounted on a top-side 702 of the wings 704 the additional aircraft 700 and outputs the energy beam 108 in a fixed direction relative to the additional aircraft 700 (generally upwards perpendicular to the additional aircraft 700). The elongated receiver 105 is mounted on the bottom-side 706 of the wings 300 of the beam-powered aircraft 102 and extends along the length of the wings (i.e., into/out of the page in FIG. 7). By maneuvering the additional aircraft 700, the energy beam 108 can be maintained on the elongated receiver 105. As shown in FIG. 8, if the beam-powered aircraft 102 is ahead of the additional aircraft 700, at least some of the energy beam 108 misses the elongated receiver 105 on the beam-powered aircraft 102, and beam power is lost. In FIG. 9, the additional aircraft 700 lowers its nose to speed up and catch up to the beam-powered aircraft 102. This action directs the energy beam 108, which in this implementation has a fixed relationship of azimuth and elevation with respect to the beam-powered aircraft 102, forward and more directly onto the elongated receiver 105. Once the additional aircraft 700 catches up to the beam-powered aircraft 102, the additional aircraft 700 levels out and the relationship is again that shown in FIG. 7.

Figure 10:
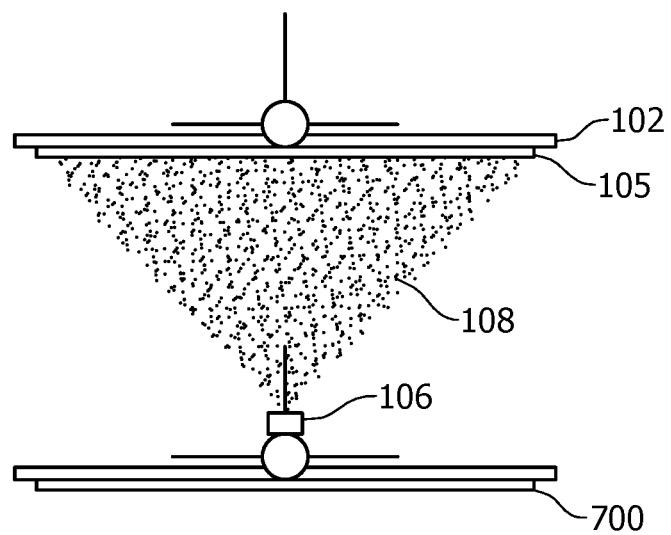
FIG. 10 is a front view of the beam-powered aircraft of FIG. 1 with an additional aircraft serving as the mount of the transmitter.
Figure 11:
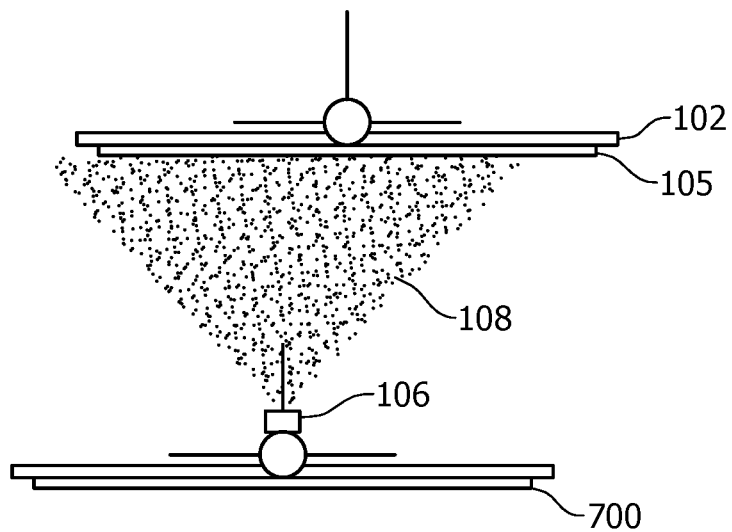
FIG. 11 is a front view of the beam-powered aircraft and the additional aircraft of FIG. 10 when the additional aircraft or the beam-powered aircraft veers to one side.
Figure 12:
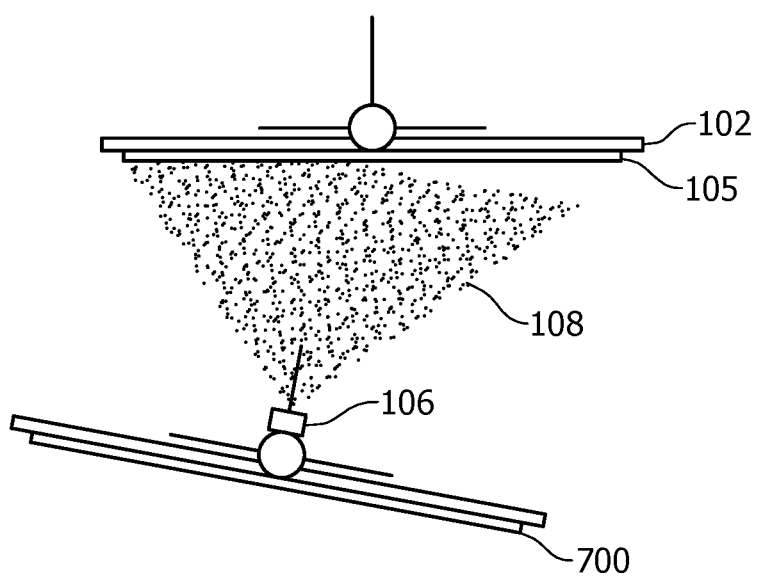
FIG. 12 is a front view of the beam-powered aircraft and the additional aircraft of FIG. 11 when the additional aircraft banks to re-center under the beam powered aircraft.

A similar alignment and correction process occurs for lateral centering, as shown in FIGS. 10, 11, and 12. In FIG. 10, the additional aircraft 700 is nominally centered underneath the beam-powered aircraft 102, so the energy beam 108 goes straight from the energy source 106 to the elongated receiver 105. The major axis 206 of the elongated cross-section of the energy beam 108 extends in the length direction of the wing 704 of the additional aircraft 700 (i.e. left to right in FIG. 10). If the additional aircraft 700 or the beam-powered aircraft 102 veers to one side (as shown FIG. 11), part of the energy beam 108 misses the elongated receiver 105. The additional aircraft 700 must return to its centered position beneath the elongated receiver 105 to re-center the energy beam 108 on the elongated receiver 105. To make a turn, the additional aircraft 700 banks, and the energy beam 108 tips toward the center of the beam-powered aircraft 102, as shown in FIG. 12. This restores power to the beam-powered aircraft 102. The additional aircraft 700 uses its rudder to avoid a change in heading (which would cause a rotation of the elongated cross-section of the energy beam 108); instead, the additional aircraft 700 performs a sideslip to move laterally under the beam-powered aircraft 102. As the additional aircraft 700 gets closer to its desired position under the center of the beam-powered aircraft 102, the bank decreases, keeping the energy beam 108 pointed directly at the elongated receiver 105. Once the additional aircraft is centered under the beam-powered aircraft 102 again, the aircraft are again positioned as shown in FIG. 10.

Mounting the energy source 106 on an aircraft may provide several technical benefits. First, an energy source 106 on an airplane is highly mobile and can provide power to the beam-powered aircraft 102 nearly anywhere. Thus, the operational range of the beam-powered aircraft 102 may be increased over other implementations. Second, with proper vertical spacing between the additional aircraft 700 and the beam-powered aircraft 102 and with appropriate maneuvers, the transmitter 104 need not have any gimbaling or rotation aside from the motion of the additional aircraft 700. Third, as long as the additional aircraft 700 stays centered below the beam-powered aircraft 102, it will be flying in the same direction as the elongated receiver 105, so the major axis 206 of the energy beam 108 stays aligned with the elongated receiver 105 along the wings of the beam-powered aircraft 102 without need for orientation sensors or communications equipment. Fourth, when the additional aircraft 700 gets out of position, the motions needed to restore the correct position relative to the beam-powered aircraft 102 also keep the energy beam 108 centered on the elongated receiver 105. Thus, the efficiency remains high and the beam-powered aircraft 102 continues to receive power. Fifth, because the angular width of the energy beam 108 can be several degrees or more, the beam transmitter can use incoherent technologies, such as LEDs or gas discharge lamps, rather than lasers or other coherent energy sources. This can lower costs and reduce operational constraints that arise when pointing high-power lasers at the sky.

Figure 13:
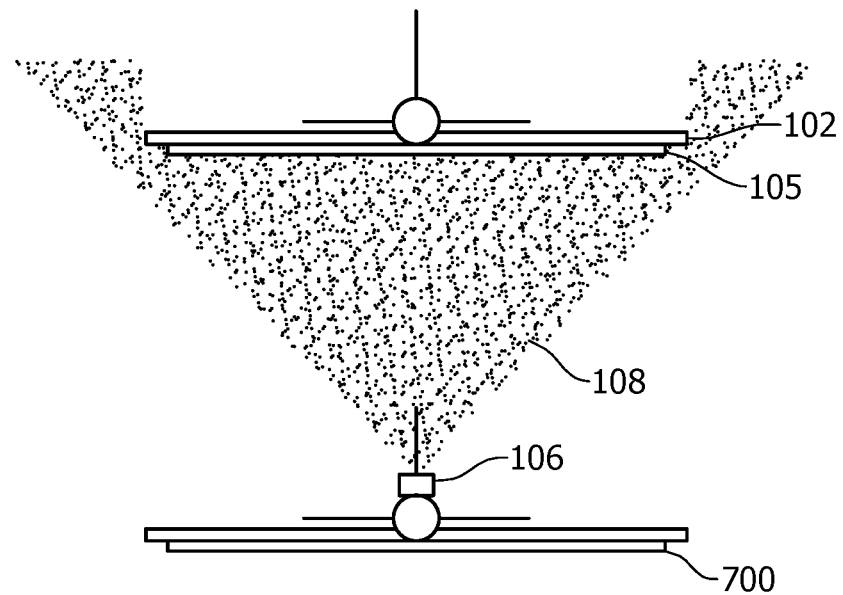
FIG. 13 is a front view of the beam-powered aircraft and the additional aircraft of FIG. 10 when the additional aircraft is too far below to the beam-powered aircraft.
Figure 14:
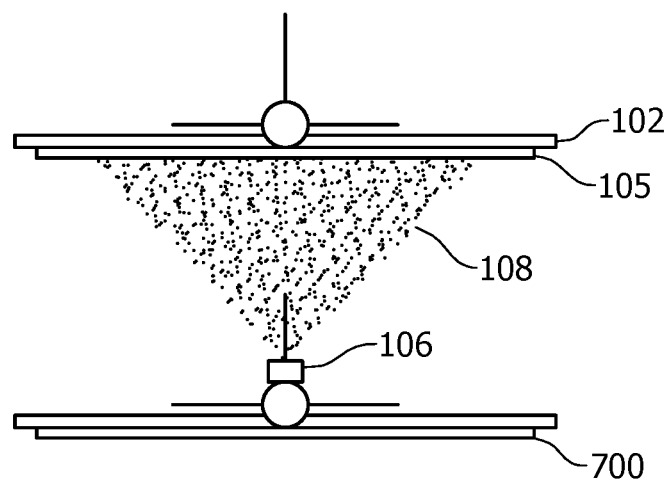
FIG. 14 is a front view of the beam-powered aircraft and the additional aircraft of FIG. 10 when the additional aircraft is too close to the beam-powered aircraft.

As shown in FIG. 13, use of a single energy source 106 with a fixed angular width may leave the system subject to sensitivity to the distance between the additional aircraft 700 and the beam-powered aircraft 102. That is, in FIG. 13, the additional aircraft 700 is a further distance below the beam-powered aircraft 102 than in FIG. 10, and portions of the energy beam 108 miss the elongated receiver 105. This energy is wasted and is not captured for use by the beam-powered aircraft 102. Similarly, if the additional aircraft is closer to the beam-powered aircraft 102, as shown in FIG. 14, the entire elongated receiver 105 is not illuminated by the energy beam 108.

Figure 15:
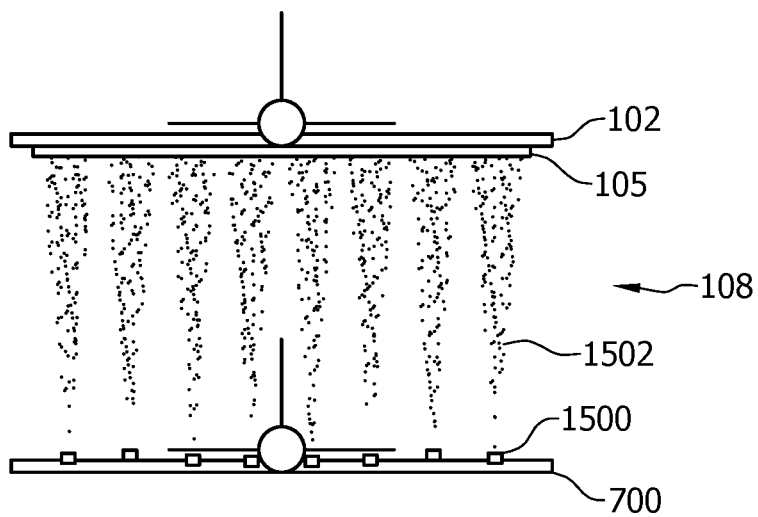
FIG. 15 is a front view of the beam-powered aircraft of FIG. 1 with an additional aircraft serving as the mount of the transmitter including multiple energy source elements along the wing of the additional aircraft.
Figure 16:
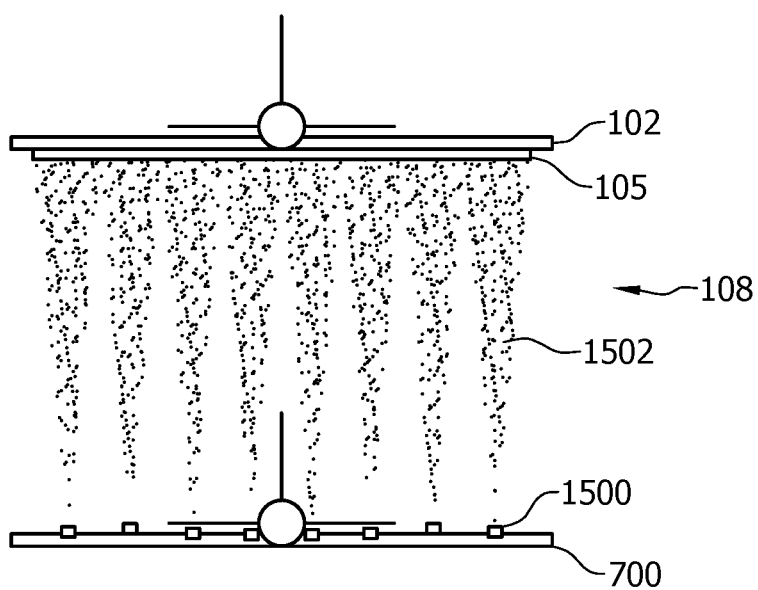
FIG. 16 is a front view of the beam-powered aircraft and the additional aircraft of FIG. 15 when the additional aircraft is too far away from the beam-powered aircraft.

Thus, in an example implementation shown in FIGS. 15 and 16, the energy source 106 is made of multiple energy source elements 1500 dispersed along the wing 704 of the additional aircraft 700, rather than having a monolithic energy source on its fuselage (as in FIGS. 10-14). In FIG. 15, the additional aircraft 700 is the correct distance below the beam-powered aircraft 102. Beams 1502 from the energy source elements 1500 intercept roughly 100% of the elongated receiver 105, so power is transmitted efficiently. Each beam 1502 has a narrower angular width than the energy beam 108 from a single energy source in FIGS. 10-14, and covers a small patch of the elongated receiver 105. The energy source elements 1500 may be considered to collectively form a single energy source 106, and the beams 1502 may be considered collectively to form a single energy beam 108. In FIG. 16, the additional aircraft is too far below the beam-powered aircraft 102 (similar to the condition in FIG. 13). The inner beams 1502 still hit the elongated receiver 105. A small percentage (e.g., about 10%) of each outer beam 1502 misses the elongated receiver 105. Although this still wastes power, a smaller amount of the overall energy beam misses the receiver and a smaller amount of power is wasted than in the condition in FIG. 13. Depending on the exact configuration of the energy source elements 1500 and how far off the additional aircraft 700 is from the beam-powered aircraft 102, the condition in FIG. 16 may waste about 2% of the power from the energy source elements as compared to about 20% wasted power in FIG. 13. Additionally, in some implementations, the separate energy source elements 1500 can be individually controlled. Thus, if the spacing between the additional aircraft 700 and the beam-powered aircraft 102 were far enough that the beams 1502 from the outermost energy source elements 1500 were not hitting the elongated receiver 105, those elements could be turned off to limit the wasted power.

In some implementations, the elongated receiver 105 is formed of multi-bandgap PV cells to make better use of the full solar spectrum. In such implementations, the energy source 106 (or the energy source elements 1500) may transmit overlapping energy beams (108 or 1502) with wavelengths and relative intensities that match the absorption characteristics of the multi-bandgap cells to enable more efficient energy transmission than would a monochromatic beam directed at multi-bandgap cells.

Figure 17:
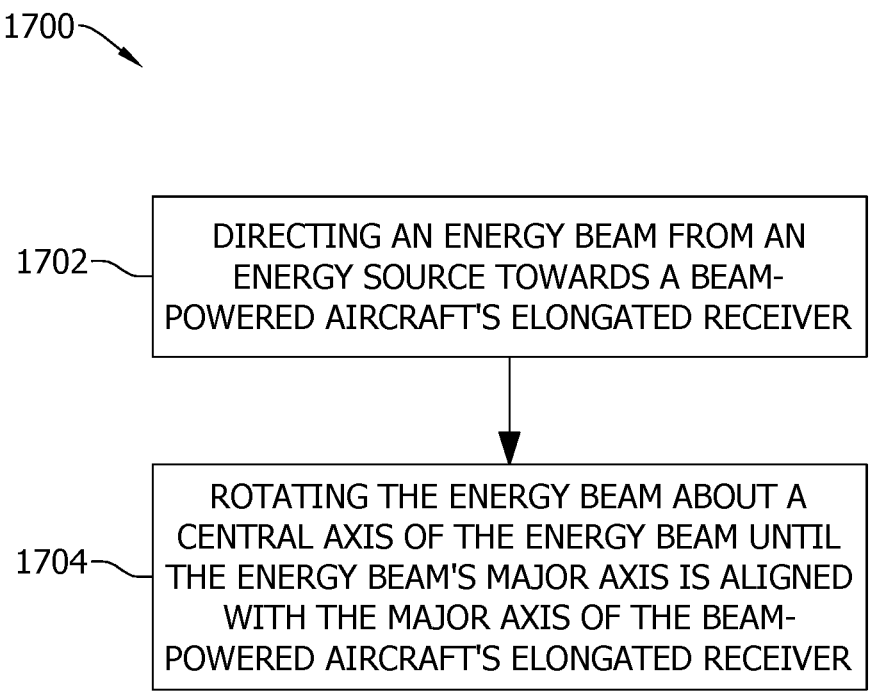
FIG. 17 is a flow diagram of an example method for powering a beam-powered aircraft having an elongated receiver with a major axis and a minor axis.

FIG. 17 is a flow diagram of an example method 1700 for powering a beam-powered aircraft having an elongated receiver with a major axis and a minor axis. At 1702, the method includes directing an energy beam from an energy source towards the beam-powered aircraft's elongated receiver. The energy beam has an elongated cross-section with a major axis and a minor axis. At 1704, the energy beam is rotated about a central axis of the energy beam until the energy beam's major axis is aligned with the major axis of the beam-powered aircraft's elongated receiver. In some implementations, directing the energy beam from the energy source at 1702 includes directing a light beam from a light source. In some implementations, the method 1700 also includes tracking a location and orientation of the beam-powered aircraft prior to directing, at 1702, an energy beam towards the beam-powered aircraft's elongated receiver. In some implementations, the energy source is mounted on an additional aircraft separate from the beam-powered aircraft, and directing the energy beam from the energy source toward the beam-powered aircraft's elongated receiver at 1702 and rotating the energy beam about the central axis of the energy beam at 1704 are performed by maneuvering the additional aircraft relative to the beam-powered aircraft.

The systems and methods described herein are not limited to the specific examples described herein, but rather, components of the systems and/or steps of the methods may be utilized independently and separately from other components and/or steps described herein.

As used herein, an element or step recited in the singular and proceeded with the word "a" or "an" should be understood as not excluding plural elements or steps unless such exclusion is explicitly recited. Furthermore, references to "one example" of the present disclosure, "an example," or "some examples" are not intended to be interpreted as excluding the existence of additional examples that also incorporate the recited features.

This written description uses examples to disclose various examples, which include the best mode, to enable any person skilled in the art to practice those examples, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A transmitter for providing energy to a beam-powered aircraft, the transmitter comprising:
   an energy source on a wing of a first aircraft, wherein the energy source outputs an energy beam having an elongated cross-section to enable an elongated receiver to receive the energy beam to power the beam-powered aircraft, wherein the elongated receiver is mounted along a wing of the beam-powered aircraft, and wherein the energy beam is to be rotated about a central axis of the energy beam to maintain an alignment of the elongated cross-section with the elongated receiver.

2. The transmitter of claim 1, wherein the energy source is a radio frequency (RF) transmitter, the energy beam is an RF beam, and the elongated receiver is an RF receiver.

3. The transmitter of claim 1, wherein the energy source is a light source, and the energy beam is a light beam.

4. The transmitter of claim 3, further comprising:
   a tracking system to track a location and orientation of the beam powered aircraft relative to the transmitter.

5. The transmitter of claim 1, wherein the energy source comprises a plurality of energy source elements, each of the energy source elements outputs a separate energy beam.

6. The transmitter of claim 5, wherein the plurality of energy source elements are dispersed along each wing of the first aircraft.

7. The transmitter of claim 5, wherein the beam from the energy source comprises each beam from the plurality of energy source elements.

8. The transmitter of claim 5, wherein the plurality of energy source elements are incoherent energy sources.

9. A beam-powered aircraft system comprising:
   a beam-powered aircraft including an elongated receiver operable to receive an energy beam to power the beam-powered aircraft, wherein the elongated receiver is mounted along a wing of the beam-powered aircraft; and
   a second aircraft comprising:
      an energy source on a wing of the second aircraft, the energy source outputs the energy beam having an elongated cross-section and a non-fixed angular width, wherein the energy beam is to be rotated about a central axis of the energy beam to maintain an alignment of the elongated cross-section with the elongated receiver.

10. The system of claim 9, wherein the energy source is a light source, and the energy beam is a light beam.

11. The system of claim 9, wherein the second aircraft further comprises a tracking system to track a location and orientation of the beam powered aircraft relative to the second aircraft.

12. The system of claim 9, wherein the energy source comprises a coherent light source.

13. The system of claim 9, wherein the energy source comprises a plurality of energy source elements, each of the energy source elements outputs a separate energy beam.

14. The system of claim 13, wherein the plurality of energy source elements are dispersed along each wing of the second aircraft.

15. The system of claim 14, wherein the plurality of energy source elements are incoherent energy sources.

16. The system of claim 9, wherein the energy beam comprises a plurality of separate energy beams.

17. A method for powering a beam-powered aircraft having an elongated receiver, the method comprising:
   directing, from an energy source on a wing of a first aircraft, an energy beam towards the elongated receiver, wherein the elongated receiver is mounted along a wing of the beam-powered aircraft, the energy beam having an elongated cross-section with a central axis, a second major axis, and a second minor axis; and
   adjusting a width of the energy beam until the width of the energy beam is aligned with the elongated receiver, wherein the energy beam is to be rotated about a central axis of the energy beam to maintain an alignment of the elongated cross-section with the elongated receiver.

18. The method of claim 17, wherein directing the energy beam from the energy source comprises directing a light beam from a light source.

19. The method of claim 17, further comprising tracking a location and orientation of the beam-powered aircraft prior to directing the energy beam towards the elongated receiver.

20. The method of claim 17, wherein the energy source comprises a plurality of energy source elements, and wherein directing the energy beam comprises directing each energy beam from the plurality of energy source elements towards the elongated receiver.

* * * * *